United States Patent
Chang

(10) Patent No.: US 9,401,035 B2
(45) Date of Patent: Jul. 26, 2016

(54) TEXT RENDERING METHOD WITH IMPROVED CLARITY OF CORNERS

(71) Applicant: CANON KABUSHIKI KAISHA, Tokyo (JP)

(72) Inventor: Albert Chang, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/520,875

(22) Filed: Oct. 22, 2014

(65) Prior Publication Data

US 2015/0117768 A1    Apr. 30, 2015

(30) Foreign Application Priority Data

Oct. 25, 2013   (AU) ................................. 2013248248

(51) Int. Cl.
  *G06K 9/46*   (2006.01)
  *G06T 11/20*  (2006.01)

(52) U.S. Cl.
  CPC .................................. *G06T 11/203* (2013.01)

(58) Field of Classification Search
CPC combination set(s) only.
See application file for complete search history.

(56) References Cited

U.S. PATENT DOCUMENTS

| 4,631,690 A | * | 12/1986 | Corthout | ................ G06T 11/40 345/420 |
| 7,034,845 B2 | | 4/2006 | Perry et al. | |
| 7,961,191 B2 | | 6/2011 | Terazono et al. | |

* cited by examiner

*Primary Examiner* — Duy M Dang
(74) *Attorney, Agent, or Firm* — Canon USA, Inc. I.P. Division

(57) ABSTRACT

A method determines a contribution of an object to an intensity value of a current pixel that is partially covered by the object by calculating an entry location and exit location for an edge of the object in the current pixel, the entry and exit locations being located on boundaries of the current pixel with different orientations. The method determines an intensity value for at least one neighboring pixel located adjacent to the current pixel, the neighboring pixel being selected based on the calculated entry and exit locations, and then determines an intensity value of the current pixel using the determined intensity value of the at least one neighboring pixel as a contribution of the object at the current pixel.

20 Claims, 17 Drawing Sheets

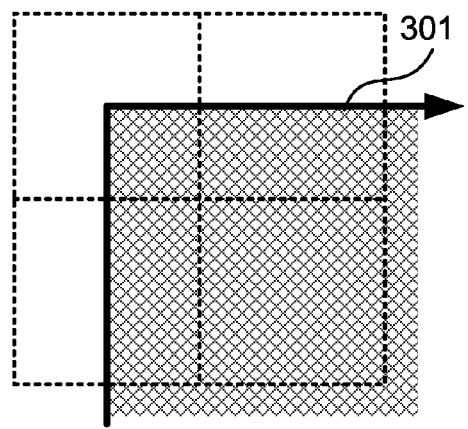
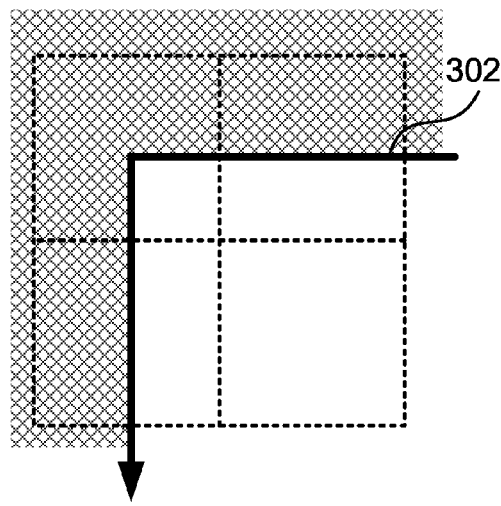
Fig. 3A     Fig. 3B
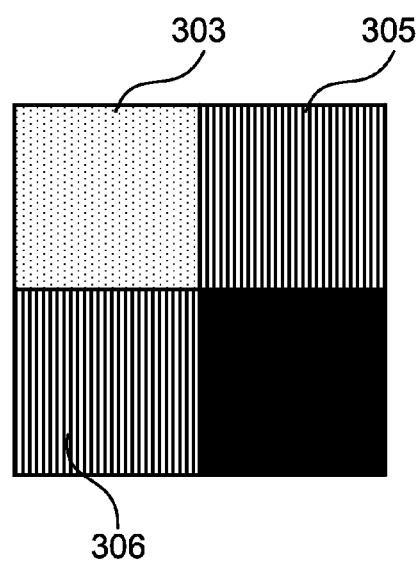
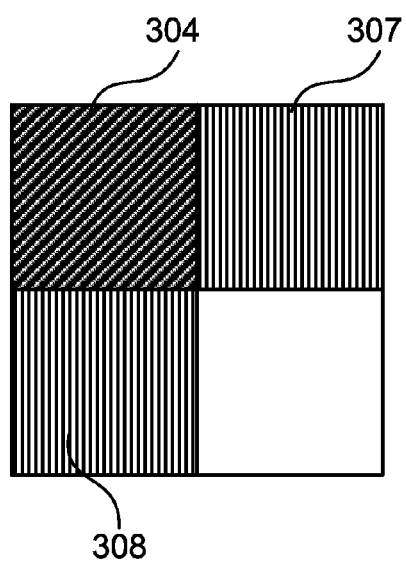
Fig. 3C     Fig. 3D

TEXT RENDERING METHOD WITH IMPROVED CLARITY OF CORNERS

REFERENCE TO RELATED PATENT APPLICATION(S)

This application claims the benefit under 35 U.S.C. §119 of the filing date of Australian Patent Application No. 2013248248, filed Oct. 25, 2013, hereby incorporated by reference in its entirety as if fully set forth herein.

TECHNICAL FIELD

The present invention relates to the rasterisation of scalable font definitions for the purpose of display on a computer screen.

BACKGROUND

In a typical computing system, text is often the preferred method for communicating to a user. The display of text by computer display devices requires the text definition to be in a rasterised form in order to allow the pixel based displays of such computing systems to be able to reproduce the text. In the past, the text characters to be displayed would be stored on a computer device in a rasterised form in a representation known as a "bitmap font". The "bitmap font" provides the raster definition for each character for the required display sizes and the pixel elements for each raster definition can easily be copied to the memory of a pixel display buffer corresponding to the display device. In order to support multiple display sizes, scalable font definitions for the characters are used and the rasterisation is performed at the time of usage at the desired display size. Font definitions may also be considered as graphical objects.

One method of rasterisation often employed is super-sampling. Super-sampling is the process of using multiple sampling positions to determine the intensity value of each pixel. By utilising multiple samples per pixel, then multiple intensity values can be derived for each pixel location. While such a method is effective in minimising the artefacts known as aliasing, it is expensive in terms of memory usage and the method is slow with increasing sampling rates (requiring more multiplication steps). Typically, a high quality AA rasterisation utilises multiplication factors of at least eight in the horizontal and vertical directions, also known as 8×8AA.

When utilising a renderer which is based on super-sampling, the coverage of a pixel is calculated in order to produce a value corresponding to the average intensity of the pixel. This intensity value often is related to the coverage area of the pixel with the object being rendered. Suppose a glyph to be rendered, such as the glyph 201 shown in FIG. 1 is defined as a vector definition. To render the glyph 201, the vector definition thereof is scaled and placed relative to a pixel grid 202 as shown in FIG. 2. The glyph 201 is scaled to produce a scaled glyph definition 204, placed relative to the pixel grid 202, and has the area 203 inside the glyph 204 that corresponds to the areas inside the shape to be rasterised. As the edges of the glyph 204 do not lie on the pixel boundaries, then some pixels of the display pixel grid 202 are only partially covered by the glyph object, and typically the rendering of the pixel edges would utilise anti-aliased rendering (as described above in super-sampling).

Shown in FIGS. 3A to 3D are the corresponding rendering of features of the glyph 204, particularly corresponding to a corner with an acute or obtuse angle 206 (which will be referred to as a non-reflex angle), shown as the corner 301 in FIG. 3A, and a corner with a reflex angle 205, shown as the corner 302 in FIG. 3B. A normal rendering using super-sampling (or any rendering based on area coverage) produces the corresponding pixel values shown in FIG. 3C and FIG. 3D, whereby the pixel 303 corresponding to the 90-degree corner 301 is of a lighter shade than its neighbouring pixels 305 and 306, and the pixel 304 corresponding to the 270-degree corner 302 is a darker shade than its neighbouring pixels 307 and 308. When the corner pixels are rendered with a different intensity value to the neighbouring pixels, the user perceives a non-sharp corner when compared to a rendering which utilises the same pixel value as one its neighbouring pixel values.

It is desirable to produce a rendering which improves the rendering of text to increase the sharpness of corners of glyphs by creating a more suitable intensity value for such corner pixels.

SUMMARY

According to one aspect of the present disclosure there is provided a method of determining a contribution of an object to an intensity value of a current pixel that is partially covered by the object, the method comprising:

(a) calculating an entry location and exit location for an edge of the object in the current pixel, the entry and exit locations being located on boundaries of the current pixel with different orientations;

(b) determining an intensity value for at least one neighbouring pixel located adjacent to the current pixel, the neighbouring pixel being selected based on the calculated entry and exit locations; and (c) determining an intensity value of the current pixel using the determined intensity value of the at least one neighbouring pixel as a contribution of the object at the current pixel.

Preferably the determining of the intensity value of the at least one neighbouring pixel comprises estimating the intensity value using the corresponding entry or exit location.

Desirably the determining of the intensity value of the current pixel comprises determining whether the edge includes a corner that subtends a reflex angle or a non-reflex angle in the current pixel using the entry and exit locations and a winding rule associated with the object.

In a specific implementation, where the corner subtends a non-reflex angle, the determining of the intensity value of the current pixel comprises:

calculating a corner pixel area (A) of the current pixel using the entry and exit locations;

estimating intensity values (B,C) of the neighbouring pixels using the corresponding entry and exit locations; and determining the intensity value of the current pixel, by darkening the corner pixel according to the estimated intensity value of one of the neighbouring pixels.

In another specific implementation, where the corner subtends a reflex angle, the determining of the intensity value of the current pixel comprises:

calculating a corner pixel area (A) of the current pixel using the entry and exit locations;

estimating intensity values (B, C) of the neighbouring pixels using the corresponding entry and exit locations; and determining the intensity value of the current pixel, by lightening the corner pixel according to the estimated intensity value of one of the neighbouring pixels.

In another implementation the determining of the intensity value of the current pixel comprises:

determining a pixel area coverage value for the corner pixel using the entry and exit locations;

forming a result by:

(i) multiplying the pixel area coverage value by an inverse of the determined intensity value corresponding to the neighbouring pixel of the pixel entry boundary where a magnitude of the entry location exceeds that of the exit location; or (ii) multiplying the pixel area coverage value by an inverse of the determined intensity value corresponding to the neighbouring pixel of the pixel exit boundary where a magnitude of the exit location exceeds that of the entry location;

determining the intensity value of the current pixel as the result where an angle of the corner is less than 180 degrees; and determining the intensity value of the current pixel as (1−result) where an angle of the corner as exceeds 180 degrees.

Preferably step (b) comprises storing determined intensity values for at least two neighbouring pixels in a sorted list data structure, and step (c) comprises:

(i) storing a coverage area value of the current pixel into the sorted list data structure; and (ii) retrieving a middle value from the sorted list data structure as the pixel intensity value for the current pixel.

According to another aspect of the present disclosure there is provided a method of determining a contribution of an object to an intensity value of a current pixel that is partially covered by the object, the method comprising:

(a) calculating an entry location and exit location for an edge of the object in the current pixel, the entry and exit locations being located on boundaries of the current pixel with perpendicular orientations;

(b) determining an intensity value for a neighbouring pixel located adjacent to the current pixel, the neighbouring pixel being selected from adjacently located pixels based on the calculated entry and exit locations; and (c) determining an intensity value of the current pixel using the determined intensity value of the neighbouring pixel.

Other aspects are also disclosed.

BRIEF DESCRIPTION OF THE DRAWINGS

At least one embodiment of the invention will now be described with reference to the following drawings, in which:

FIGS. 3A to 3D illustrate two example prior art corner pixels (FIGS. 3A and 3B) identified from FIG. 2 with corresponding rendering output (FIGS. 3C and 3D) according to the super-sampled method;

DETAILED DESCRIPTION INCLUDING BEST MODE

Context

The arrangements presently disclosed alleviate the problem of corner pixels appearing non-sharp by generating pixel intensity values, corresponding to corner positions of outlines, which are closer to what the user expects to perceive. The generated intensity values can then be stored in a pixel display buffer for reproduction upon a display device.

Figure 1:
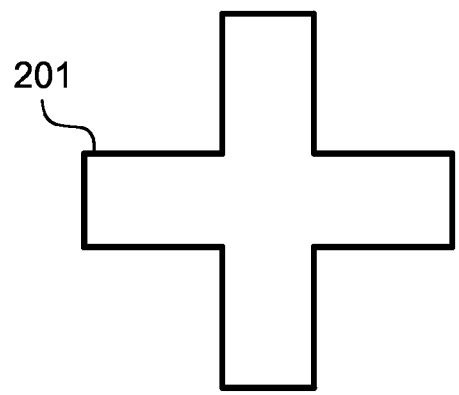
FIG. 1 shows an exemplary glyph.
Figure 2:
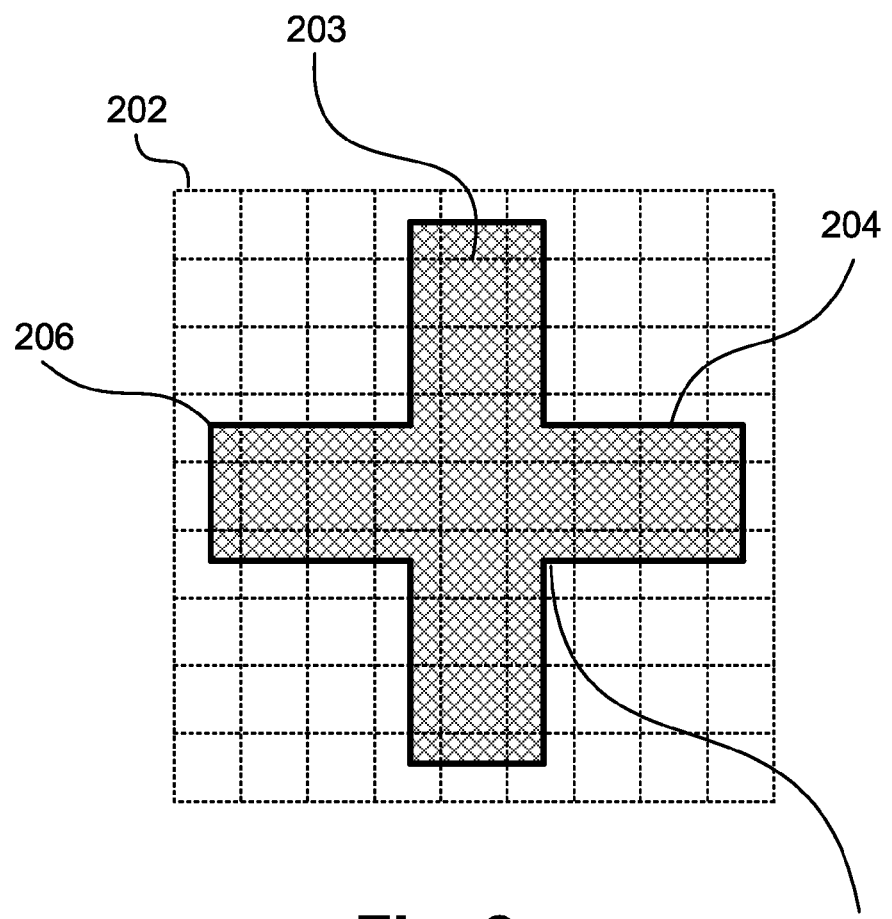
FIG. 2 shows the example glyph as a scaled version relative to the pixel grid ready for rendering.
Figure 4A:
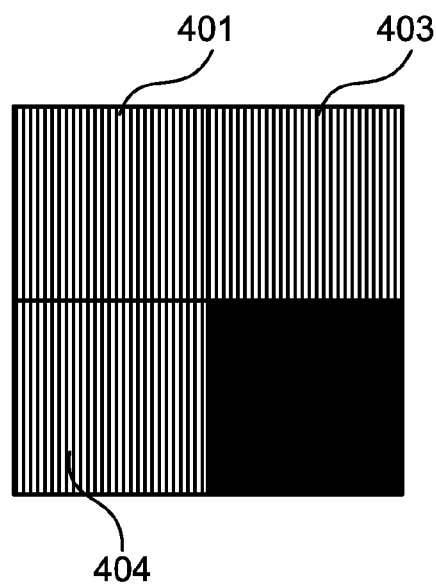
FIGS. 4A and 4B illustrates exemplary output according to the present disclosure corresponding to the examples in FIG. 3A to 3D.

For the example shown in FIG. 3A, corresponding to a 90-degree angle, with the corresponding rendering using the super-sampling method shown in FIG. 3C, an output from the presently disclosed method is shown in FIG. 4A. In FIG. 4A, the corner pixel 401 corresponds to the corner pixel of the edge 301, has a similar intensity value to its neighbouring pixels 403 and 404. It should be noted that the intensity of the corner pixel 401 is darker than that of pixel 303.

A corner pixel may be any pixel where an edge exits a pixel via a side of the pixel that is adjacent an entry point of the edge to the pixel.

Figure 4B:
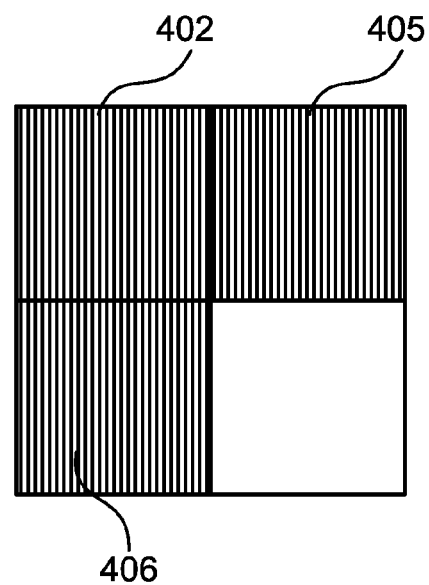

For the example shown in FIG. 3B, corresponding to a 270-degree angle, which produced the corresponding render in FIG. 3D, the presently disclosed method produces the output as shown in FIG. 4B. In FIG. 4B, the corner pixel 402 corresponds to the corner pixel of the edge 302, has a similar intensity value to its neighbouring pixels 405 and 406. It should be noted that the intensity of pixel 401 is lighter than that of pixel 304.

Figure 5A:
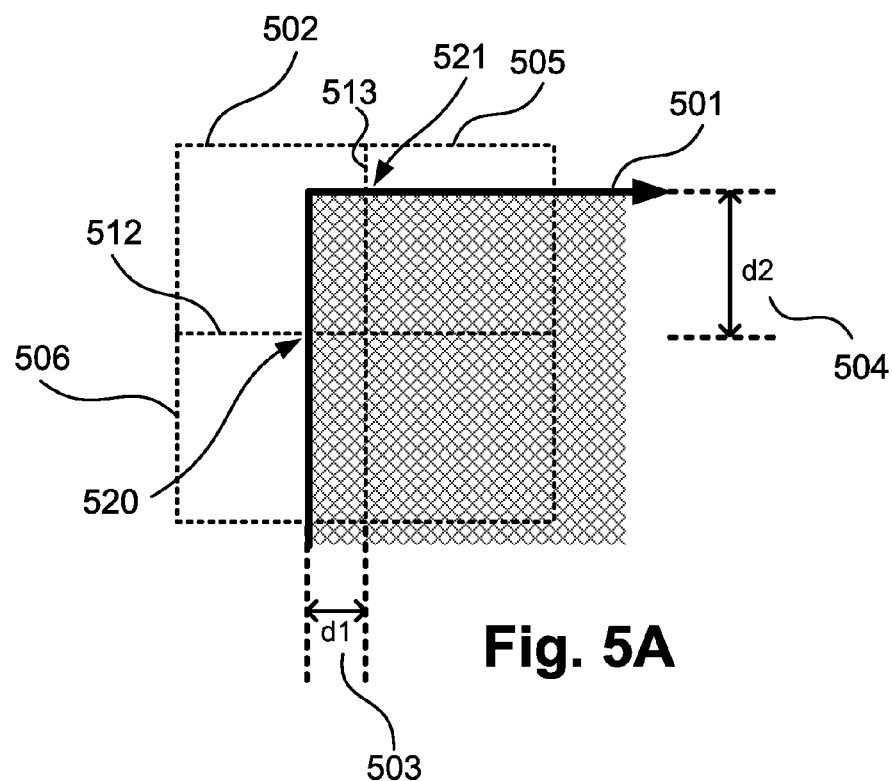
FIGS. 5A to 5C illustrate another example of a pixel corresponding to a corner pixel with two different neighbouring pixel intensities (FIG. 5A), with the corresponding rendering output (FIGS. 5B and 5C) from the super-sampling rendering method and the rendering according to the present disclosure.
Figure 5B:
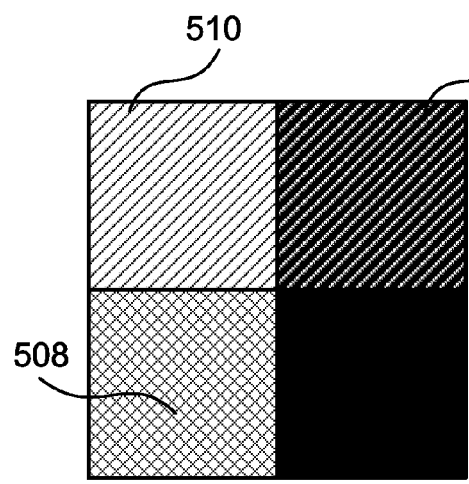
Figure 5C:
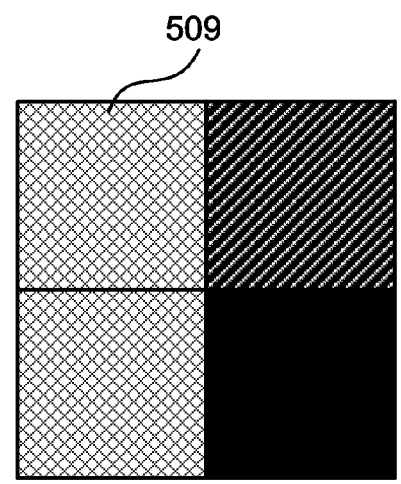

With reference to FIG. 5, another example is shown whereby the magnitude of entry and exit positions into a corner pixel are not equal. In this example, an edge 501 corresponding to a corner section of an outline, which intersects a corner pixel 502 at an entry position 520 on the bottom boundary 512 of the pixel 502 at a distance d1 503 from the right boundary 513, and at an exit position 521 on the right boundary 513 of the pixel 502 with a distance d2 504 from the bottom boundary 512. As will be apparent, the distances d1 503 and d2 504 on the respective pixel boundaries 512 and 513 are therefore representative of entry and exit locations of the edge 501 in the corner pixel 502, and have different orientations. In this example, the distances d1 and d2 are different, and the two neighbouring pixels 505 and 506 have different intensity values. Shown in FIG. 5B is a rendering of the edge 501 using the super-sampling method of rendering. It can be seen that the neighbouring pixels 507 and 508 are different in intensity, where pixel 507 has an intensity which is darker than the intensity of pixel 508—this is due to the distance d2 504 being greater than the distance d1 503. Using the super-sampling based method of rendering, the corner pixel 502 results in the pixel intensity 510 that is lighter than its neighbours 507 and 508. A preferred rendering is shown in FIG. 5C. The preferred rendering in FIG. 5C is similar to that of FIG. 5B with the exception that the intensity of pixel 509 features an intensity value that is different to the intensity of the corner pixel 510. In FIG. 5C, the corner pixel 509 has a similar intensity value to the neighbour with the lighter intensity value 508. This rendering result enhances the contrast of the pixel without it being overly dark which would otherwise result in visual artefacts.

Hardware Implementation

Figure 17A:
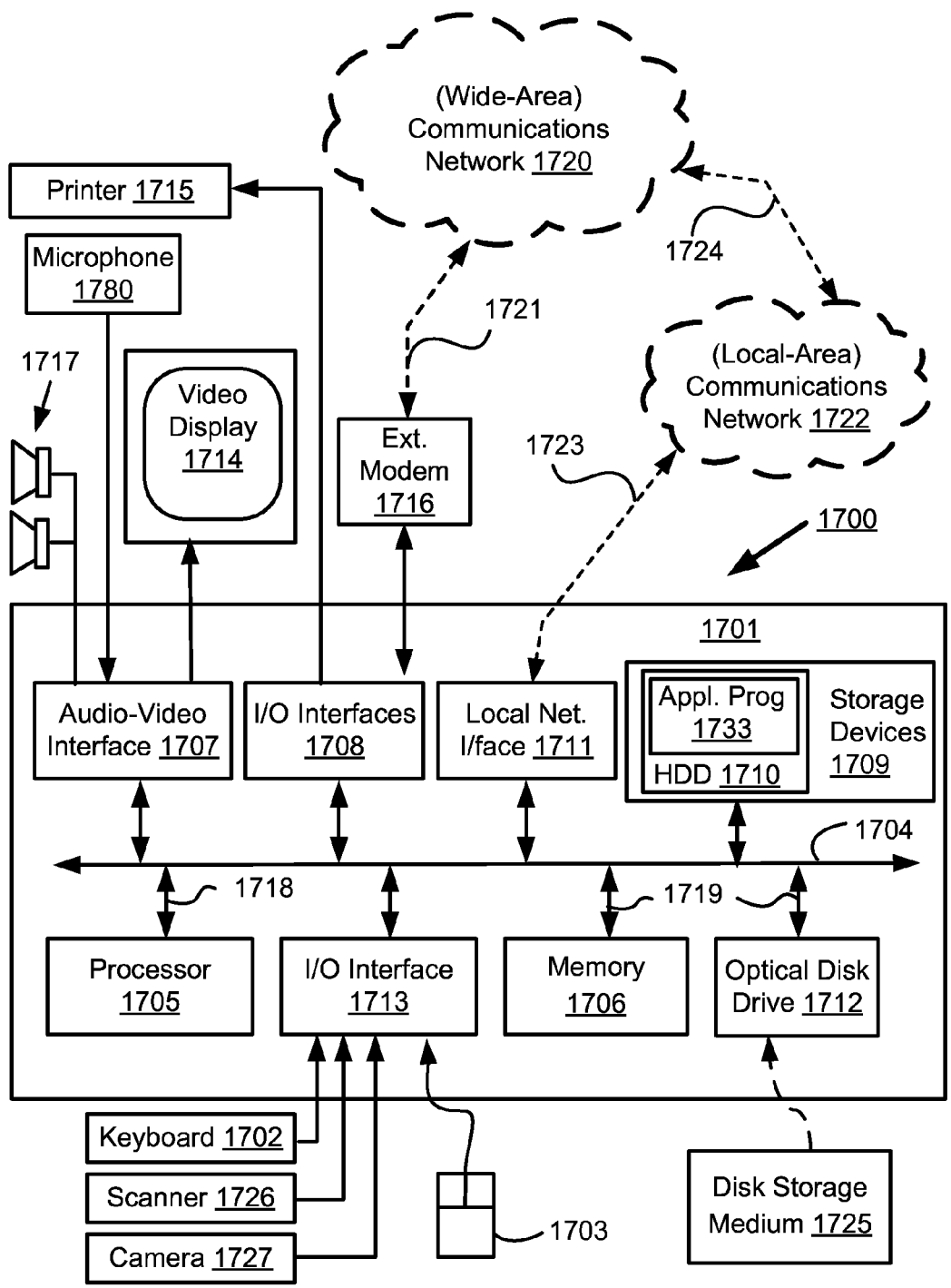
FIGS. 17A and 17B form a schematic block diagram of a general purpose computer system upon which arrangements described can be practiced.
Figure 17B:
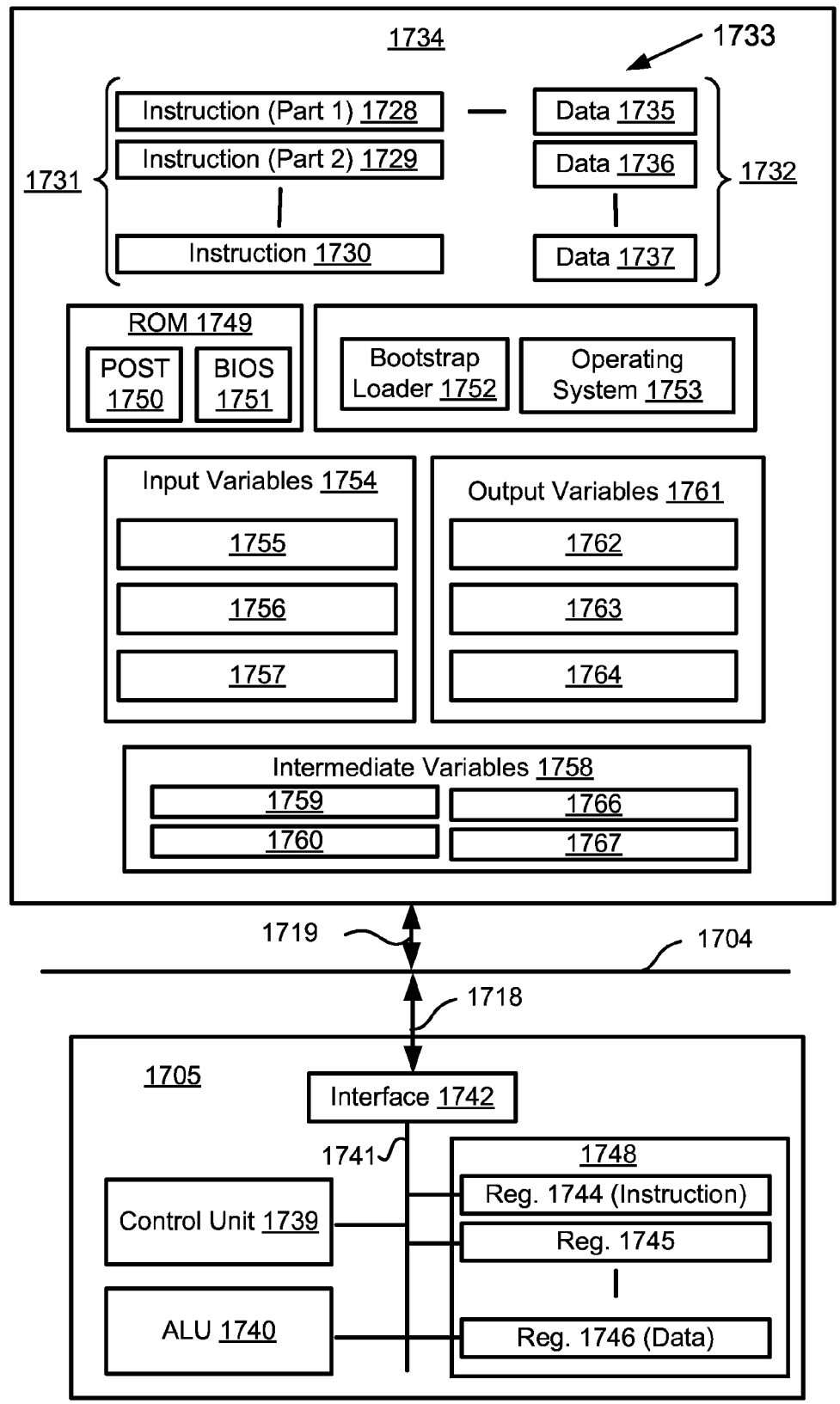

FIGS. 17A and 17B depict a general-purpose computer system 1700, upon which the various arrangements described can be practiced.

As seen in FIG. 17A, the computer system 1700 includes: a computer module 1701; input devices such as a keyboard 1702, a mouse pointer device 1703, a scanner 1726, a camera 1727, and a microphone 1780; and output devices including a printer 1715, a display device 1714 and loudspeakers 1717. An external Modulator-Demodulator (Modem) transceiver device 1716 may be used by the computer module 1701 for communicating to and from a communications network 1720 via a connection 1721. The communications network 1720 may be a wide-area network (WAN), such as the Internet, a cellular telecommunications network, or a private WAN. Where the connection 1721 is a telephone line, the modem 1716 may be a traditional "dial-up" modem. Alternatively, where the connection 1721 is a high capacity (e.g., cable) connection, the modem 1716 may be a broadband modem. A wireless modem may also be used for wireless connection to the communications network 1720.

The computer module 1701 typically includes at least one processor unit 1705, and a memory unit 1706. For example, the memory unit 1706 may have semiconductor random access memory (RAM) and semiconductor read only memory (ROM). The computer module 1701 also includes an number of input/output (I/O) interfaces including: an audio-video interface 1707 that couples to the video display 1714, loudspeakers 1717 and microphone 1780; an I/O interface 1713 that couples to the keyboard 1702, mouse 1703, scanner 1726, camera 1727 and optionally a joystick or other human interface device (not illustrated); and an interface 1708 for the external modem 1716 and printer 1715. In some implementations, the modem 1716 may be incorporated within the computer module 1701, for example within the interface 1708. The computer module 1701 also has a local network interface 1711, which permits coupling of the computer system 1700 via a connection 1723 to a local-area communications network 1722, known as a Local Area Network (LAN). As illustrated in FIG. 17A, the local communications network 1722 may also couple to the wide network 1720 via a connection 1724, which would typically include a so-called "firewall" device or device of similar functionality. The local network interface 1711 may comprise an Ethernet circuit card, a Bluetooth™ wireless arrangement or an IEEE 802.11 wireless arrangement; however, numerous other types of interfaces may be practiced for the interface 1711.

The I/O interfaces 1708 and 1713 may afford either or both of serial and parallel connectivity, the former typically being implemented according to the Universal Serial Bus (USB) standards and having corresponding USB connectors (not illustrated). Storage devices 1709 are provided and typically include a hard disk drive (HDD) 1710. Other storage devices such as a floppy disk drive and a magnetic tape drive (not illustrated) may also be used. An optical disk drive 1712 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1700. Any of these storage devices, and/or the communications networks 1720 and 1722 may for a source of text data that represents an input to the processes described in this document and for which improved reproduction upon the video display 1714 is desired.

The components 1705 to 1713 of the computer module 1701 typically communicate via an interconnected bus 1704 and in a manner that results in a conventional mode of operation of the computer system 1700 known to those in the relevant art. For example, the processor 1705 is coupled to the system bus 1704 using a connection 1718. Likewise, the memory 1706 and optical disk drive 1712 are coupled to the system bus 1704 by connections 1719. Examples of computers on which the described arrangements can be practised include IBM-PC's and compatibles, Sun Sparcstations, Apple Mac™ or a like computer systems.

The methods of determining object contributions at pixel locations may be implemented using the computer system 1700 wherein the processes of FIGS. 1 to 16, to be described, may be implemented as one or more software application programs 1733 executable within the computer system 1700. In particular, the steps of the methods to be described are effected by instructions 1731 (see FIG. 17B) in the software 1733 that are carried out within the computer system 1700. The software instructions 1731 may be formed as one or more code modules, each for performing one or more particular tasks. The software may also be divided into two separate parts, in which a first part and the corresponding code modules performs the contribution and rendering methods and a second part and the corresponding code modules manage a user interface between the first part and the user, where desired.

The software may be stored in a computer readable medium, including the storage devices described below, for example. The software is loaded into the computer system 1700 from the computer readable medium, and then executed by the computer system 1700. A computer readable medium having such software or computer program recorded on the computer readable medium is a computer program product. The use of the computer program product in the computer system 1700 preferably effects an advantageous apparatus for determining a contribution of an object to an intensity value of a pixel that is partially covered by the object.

The software 1733 is typically stored in the HDD 1710 or the memory 1706. The software is loaded into the computer system 1700 from a computer readable medium, and executed by the computer system 1700. Thus, for example, the software 1733 may be stored on an optically readable disk storage medium (e.g., CD-ROM) 1725 that is read by the optical disk drive 1712. A computer readable medium having such software or computer program recorded on it is a computer program product. The use of the computer program product in the computer system 1700 preferably effects an apparatus for determining a contribution of an object to an intensity value of a pixel that is partially covered by the object.

In some instances, the application programs 1733 may be supplied to the user encoded on one or more CD-ROMs 1725 and read via the corresponding drive 1712, or alternatively may be read by the user from the networks 1720 or 1722. Still further, the software can also be loaded into the computer system 1700 from other computer readable media. Computer readable storage media refers to any non-transitory tangible storage medium that provides recorded instructions and/or data to the computer system 1700 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1701. Examples of transitory or non-tangible computer readable transmission media that may also participate in the provision of software, application programs, instructions and/or data to the computer module 1701 include radio or infra-red transmission channels as well as a network connection to another computer or networked device, and the Internet or Intranets including e-mail transmissions and information recorded on Websites and the like.

The second part of the application programs 1733 and the corresponding code modules mentioned above may be executed to implement one or more graphical user interfaces (GUIs) to be rendered or otherwise represented upon the display 1714. Through manipulation of typically the keyboard 1702 and the mouse 1703, a user of the computer system 1700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1717 and user voice commands input via the microphone 1780.

FIG. 17B is a detailed schematic block diagram of the processor 1705 and a "memory" 1734. The memory 1734 represents a logical aggregation of all the memory modules (including the HDD 1709 and semiconductor memory 1706) that can be accessed by the computer module 1701 in FIG. 17A.

When the computer module 1701 is initially powered up, a power-on self-test (POST) program 1750 executes. The POST program 1750 is typically stored in a ROM 1749 of the semiconductor memory 1706 of FIG. 17A. A hardware device such as the ROM 1749 storing software is sometimes referred to as firmware. The POST program 1750 examines hardware within the computer module 1701 to ensure proper functioning and typically checks the processor 1705, the memory 1734 (1709, 1706), and a basic input-output systems software (BIOS) module 1751, also typically stored in the ROM 1749, for correct operation. Once the POST program 1750 has run successfully, the BIOS 1751 activates the hard disk drive 1710 of FIG. 17A. Activation of the hard disk drive 1710 causes a bootstrap loader program 1752 that is resident on the hard disk drive 1710 to execute via the processor 1705. This loads an operating system 1753 into the RAM memory 1706, upon which the operating system 1753 commences operation. The operating system 1753 is a system level application, executable by the processor 1705, to fulfil various high level functions, including processor management, memory management, device management, storage management, software application interface, and generic user interface.

The operating system 1753 manages the memory 1734 (1709, 1706) to ensure that each process or application running on the computer module 1701 has sufficient memory in which to execute without colliding with memory allocated to another process. Furthermore, the different types of memory available in the system 1700 of FIG. 17A must be used properly so that each process can run effectively. Accordingly, the aggregated memory 1734 is not intended to illustrate how particular segments of memory are allocated (unless otherwise stated), but rather to provide a general view of the memory accessible by the computer system 1700 and how such is used.

As shown in FIG. 17B, the processor 1705 includes a number of functional modules including a control unit 1739, an arithmetic logic unit (ALU) 1740, and a local or internal memory 1748, sometimes called a cache memory. The cache memory 1748 typically include a number of storage registers 1744-1746 in a register section. One or more internal busses 1741 functionally interconnect these functional modules. The processor 1705 typically also has one or more interfaces 1742 for communicating with external devices via the system bus 1704, using a connection 1718. The memory 1734 is coupled to the bus 1704 using a connection 1719.

The application program 1733 includes a sequence of instructions 1731 that may include conditional branch and loop instructions. The program 1733 may also include data 1732 which is used in execution of the program 1733. The instructions 1731 and the data 1732 are stored in memory locations 1728, 1729, 1730 and 1735, 1736, 1737, respectively. Depending upon the relative size of the instructions 1731 and the memory locations 1728-1730, a particular instruction may be stored in a single memory location as depicted by the instruction shown in the memory location 1730. Alternately, an instruction may be segmented into a number of parts each of which is stored in a separate memory location, as depicted by the instruction segments shown in the memory locations 1728 and 1729.

In general, the processor 1705 is given a set of instructions which are executed therein. The processor 1705 waits for a subsequent input, to which the processor 1705 reacts to by executing another set of instructions. Each input may be provided from one or more of a number of sources, including data generated by one or more of the input devices 1702, 1703, data received from an external source across one of the networks 1720, 1702, data retrieved from one of the storage devices 1706, 1709 or data retrieved from a storage medium 1725 inserted into the corresponding reader 1712, all depicted in FIG. 17A. The execution of a set of the instructions may in some cases result in output of data. Execution may also involve storing data or variables to the memory 1734.

The disclosed arrangements use input variables 1754, which are stored in the memory 1734 in corresponding memory locations 1755, 1756, 1757. The arrangements produce output variables 1761, which are stored in the memory 1734 in corresponding memory locations 1762, 1763, 1764. Intermediate variables 1758 may be stored in memory locations 1759, 1760, 1766 and 1767.

Referring to the processor 1705 of FIG. 17B, the registers 1744, 1745, 1746, the arithmetic logic unit (ALU) 1740, and the control unit 1739 work together to perform sequences of micro-operations needed to perform "fetch, decode, and execute" cycles for every instruction in the instruction set making up the program 1733. Each fetch, decode, and execute cycle comprises:

(i) a fetch operation, which fetches or reads an instruction 1731 from a memory location 1728, 1729, 1730;

(ii) a decode operation in which the control unit 1739 determines which instruction has been fetched; and (iii) an execute operation in which the control unit 1739 and/or the ALU 1740 execute the instruction.

Thereafter, a further fetch, decode, and execute cycle for the next instruction may be executed. Similarly, a store cycle may be performed by which the control unit 1739 stores or writes a value to a memory location 1732.

Each step or sub-process in the processes of FIGS. 1 to 16 is associated with one or more segments of the program 1733 and is performed by the register section 1744, 1745, 1747, the ALU 1740, and the control unit 1739 in the processor 1705 working together to perform the fetch, decode, and execute cycles for every instruction in the instruction set for the noted segments of the program 1733.

Overview

Figure 6:
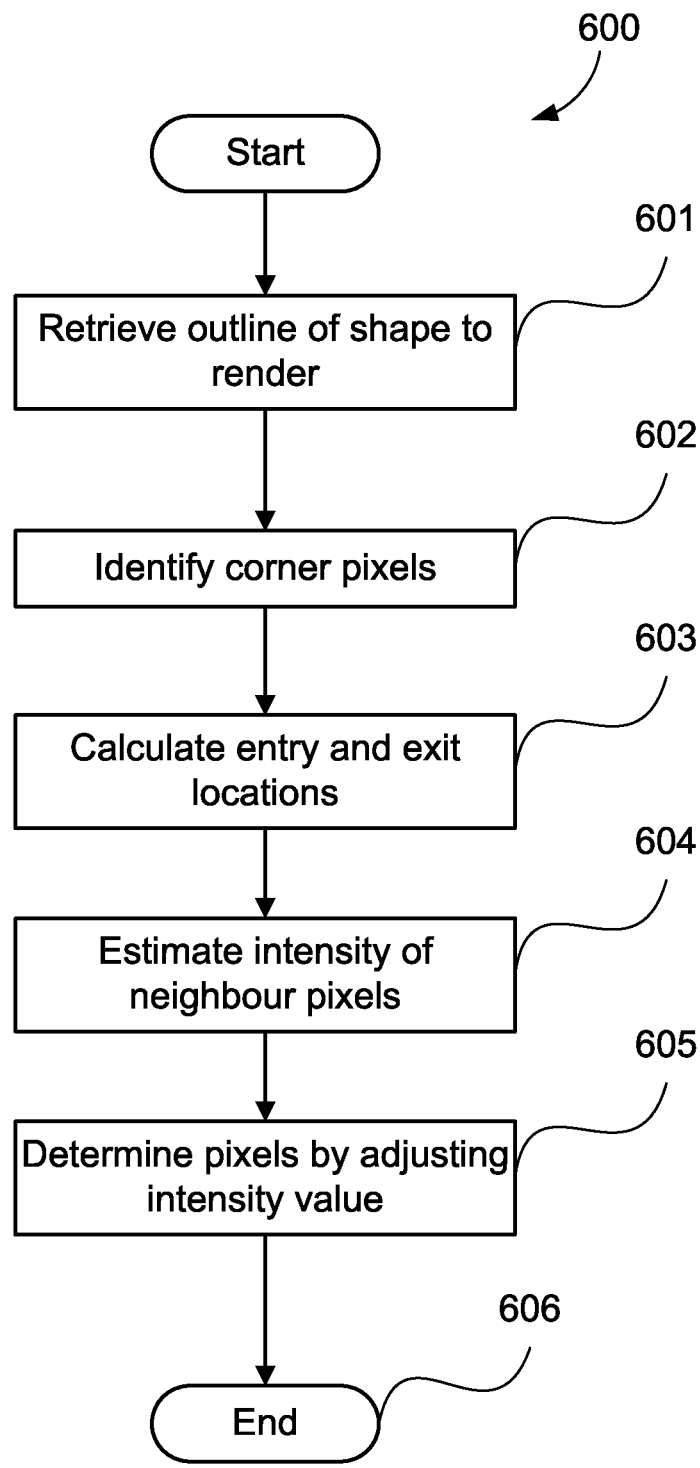
FIG. 6 is a schematic flow diagram illustrating a method of processing and determining the pixel intensity of corner pixels.

FIG. 6 is a flowchart of a method 600, preferably implemented in software and executable by the computer 1701, for processing and determining the pixel intensity of corner pixels, particularly in text objects. In the method 600, the processor 1705 firstly retrieves an outline definition that is to be rendered at step 601. The outline definition is typically formed as a graphical object or a glyph, being a collection of such objects, and typically is representative of a text character or a font desired to be accurately reproduced upon the display device 1714. It can be assumed that the outline definition is pre-transformed and is thus at the correct size, relative the pixel grid, is vectorised, and is therefore otherwise ready for rendering. With reference to the target pixel grid, being that defined by the individual pixel locations to be reproduced on the display device (and which may or may not correspond with the individual pixel location of the display device 1714), the outline definition is then analysed at step 602 in order to identify the corner pixels. For the identified corner pixels, the entry and exit positions are calculated at step 603 which are then used to estimate the neighbouring pixel intensities at step 604. Using the neighbouring pixel intensities, the intensity for the corner pixels are calculated at step 605, using the estimated intensity of the neighbouring pixels. Once the corner pixels have been generated, then the process 600 for calculating the pixel values is complete at step 606. The determined pixel values can then be stored and/or rendered to the display device 1714.

It should be noted that while the presently disclosed arrangements relate to the process for calculation of the intensity value for corner pixels, non-corner pixel values associated with the shape outline may be generated using any other known rendering method, such as super-sampling.

In one implementation, the retrieval of the outline of the shape performed in step 601 occurs as a result of the processor 1705 performing a lookup in a font file, whereby a character code to be rendered is received, and the corresponding outline definition for the character is retrieved from a font file, for example stored in the HDD 1710. Typically, the outline definition is defined by a set of control points which forms an enclosed shape. The area within the interior of the enclosed shape is filled. Often, the area to be filled is defined according to a winding rule, known in the art of shape rendering. In some applications, the winding rule may be the odd-even winding rule, whereas in others, it may be the non-zero winding rule.

Typically for fonts, the winding rule employed often does not impact significantly on the output, as outlines corresponding to font characters tend to be non-overlapping, and non-intersecting, and tend therefore to have winding counts of either zero or one. In the described implementations, where not otherwise stated, the winding rule will be assumed to be non-zero, whereby the area to-the-right side of the edge with consideration of the heading or the direction of the edge, is filled. For example, an edge that is upwards heading would increase the winding count by 1, and an edge that is downwards heading would decrease the winding count by 1. Therefore, regions of a shape with a winding count of one are filled, and areas with a winding count of zero are not filled. As only two possible winding count rules are possible for text, the behaviour for non-zero and odd-even windowing rule produces the same result.

Before rendering can take place, the outline definition is subjected to a process of transformation, whereby the shape is subjected to rotation, scaling and translation, in order to position the outline in an orientation and size suitable for display.

The control points defining the closed shape may correspond to straight segments, or curved segments. For the case of curved segments, the control points may correspond to Bézier curve control points or splines. Typically, to simplify the rendering steps, one may convert the curved segments into straight edges through a process known as vectorisation. Once the curve edges are vectorised, then the rendering process considers only straight edges.

The process of vectorisation is applied to curve segments defined by Bezier curve control points, which can be performed by iterative sub-division of the curve, until a set of straight edges sufficiently approximating the actual curve. The required level of approximation depends on the required level of quality and/or the required level of performance.

Generally, the process of identifying corner pixels is performed at step 602 by examining the intersection positions of boundaries of a pixel corresponding to the outline being rendered. Typically, a corner pixel would be intersected by the edges on a horizontal pixel boundary and a vertical pixel boundary.

Figure 7A:
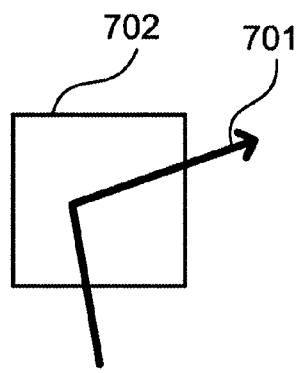
FIGS. 7A to 7C illustrate examples of use cases of pixels detected as corner pixels.
Figure 7B:
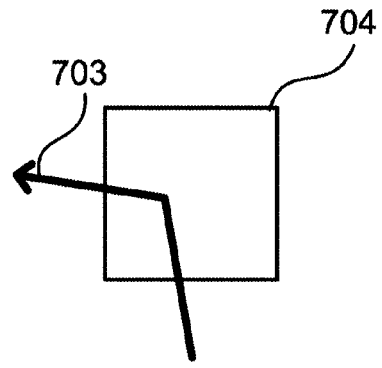
Figure 7C:
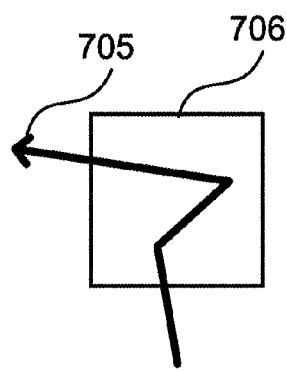

With reference to FIGS. 7A to 7C, the corner detection process is explained in more detail. The process of detecting corners is performed by checking the pixel boundaries for which the edges intersect a pixel. A corner pixel is detected whenever both a horizontal boundary and a vertical boundary of a pixel are intersected by an edge of the outline. As shown in FIG. 7A, a pixel 702 is intersected at the bottom boundary and the right boundary by edge 701. Similarly, shown in FIG. 7B, a pixel 704 is intersected at the bottom boundary and left boundary by edge 703. Similarly for complex cases, such as that illustrated in FIG. 7C, the complex edge composed of multiple edge segments 705 intersects the boundaries of the pixel 706. As the intersections occur on a vertical and horizontal pixel boundary, then this is sufficient to detect the possibility of a corner being present.

Once the corner pixels are identified, the entry positions and the exit positions are determined at step 603. While step 602 of identifying corner pixels would have identified the pixel boundaries intersected, the entry and exit positions at the corner pixel need to be determined.

Figure 8A:
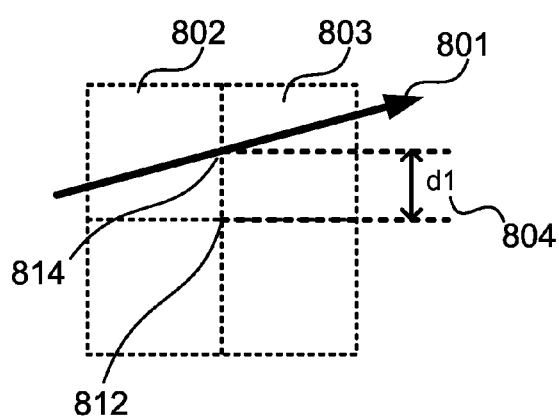
FIGS. 8A to 8D illustrates examples for the calculation of entry and exit positions for pixels, as intersected by an edge.
Figure 8B:
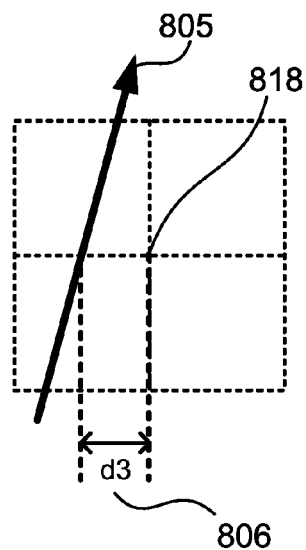
Figure 8C:
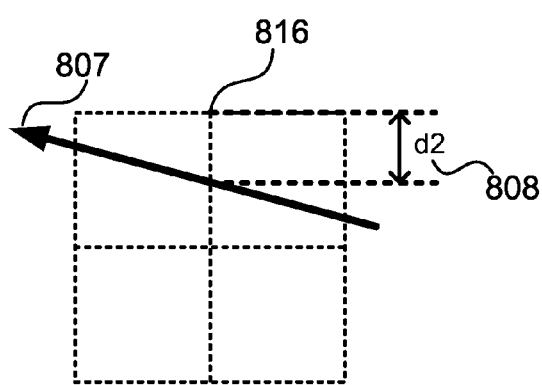
Figure 8D:
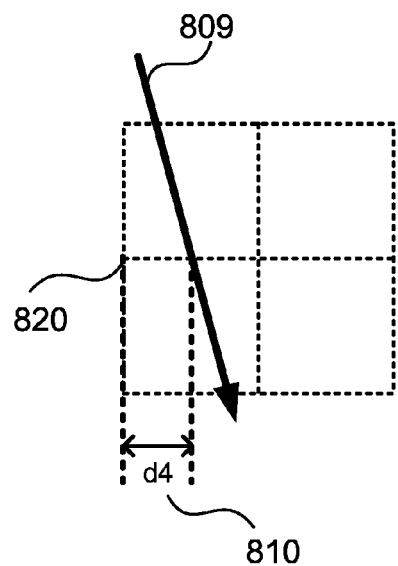

With reference to FIG. 8A, FIG. 8B, FIG. 8C, and FIG. 8D, the calculation of the entry and exit positions will be explained. The entry positions correspond to the pixel boundary intersection location, the pixel boundary intersected by the edge and the side of the edge that the outline is filled. For example, as shown in FIG. 8A, an edge 801 that is increasing in the rightwards direction and intersects at 814 a vertical pixel boundary, then the distance d1 804 corresponds to the distance between the intersection position and the pixel corner 812 below the intersection position 814. For another example as shown in FIG. 8C, an edge 807 that is increasing in the leftwards direction and intersects a vertical pixel boundary, then the distance d2 808 corresponds to the distance between the intersection position and the pixel corner position 816 above the intersection position. For another example shown in FIG. 8B, an edge 805 that is increasing in the upwards direction and intersects a horizontal pixel boundary, then the distance d3 806 corresponds to the distance between the intersection position and the pixel corner position 818 to the right of intersection position. For another example shown in FIG. 8D, an edge 809 that is increasing in the downwards direction and intersects a horizontal pixel boundary, then the distance d4 810 corresponds to the distance between the intersection position and the pixel corner position 820 to the left of intersection position.

Additionally the determination of the entry position corresponds to the exit position associated with the previous neighbouring pixel. As shown in FIG. 8A, the pixel 802 shares its right pixel boundary with the left pixel boundary of a neighbouring pixel 803, then the exit position for the first pixel 802 has the same value d1 804 as the entry position for the next neighbour pixel 803. Once the exit position for the first pixel is determined then the entry position for the next neighbour is found and the next exit position is determined.

Figure 9:
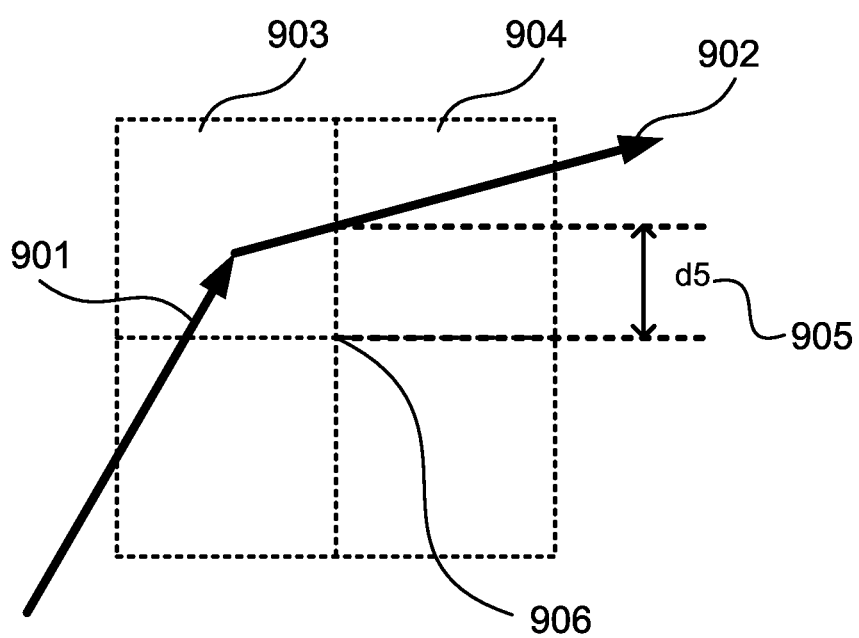
FIG. 9 illustrates the calculation of entry and exit positions for pixel, as intersected by multiple edges.

While the above explains example entry and exit positions in the context of single straight line edges that intersect the pixel boundaries, similar mechanisms are possible for pixel intersections involving multiple edges. With reference to FIG. 9, an example involving multiple edges is explained. In the example shown in FIG. 9, a pixel 903 is intersected by two adjoining edges 901 and 902. The first edge 901 enters the pixel 903 whereas the second edge 902 exits the pixel 903. In this example, edge 902 is increasing in the rightwards direction and intersects a vertical pixel boundary, then the distance d5 905 corresponds to the distance between the intersection position and the pixel corner 906 below the intersection position. It is determined that the exit position for the corner pixel 903 has the distance d5 905 and that the entry position for the neighbour pixel 904 also has a distance d5 905.

Once the intersection positions of the pixel intersection pixels are determined according to step 603, then estimations of the intensity of the neighbouring pixels can be calculated in step 604.

Figure 10:
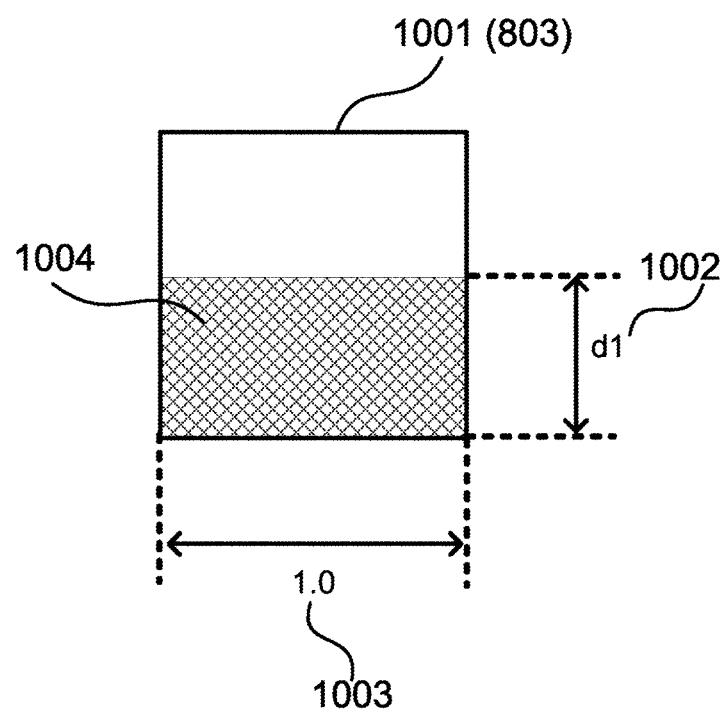
FIG. 10 illustrates a method of estimation of the area coverage of a neighbouring pixel.

In one implementation, the approximation of the intensity is derived as a function of the area coverage of the pixel. When area coverage is used, the total area of a pixel is represented as a fractional value within the range of 0.0 to 1.0, whereby a value of 0.0 specifies an area value of zero coverage, and a value of 1.0 represents the total area coverage of the pixel. When the pixel area is specified to within the range 0.0, 1.0, then one may estimate the areas directly using the pixel entry and exit locations. With reference to FIG. 8A and FIG. 10, the area estimation is described. For the example pixel 802 in FIG. 8A with neighbouring pixel 803 is intersected at the pixel boundary with distance d1 804. The area corresponding to the neighbouring pixel 803 is shown in FIG. 10 as 1001, with the rectangular area 1004, with vertical dimension d1 1002 and horizontal (unit) dimension 1.0 1003. Given that the area of a rectangle may be calculated as the product of its dimensions, then the given area 1004 would have a value of d1. One may therefore utilise the pixel intersection positions as the estimation for the neighbouring pixel area, thus corresponding to the intensity value.

In a preferred implementation, the pixel intensity is represented by a value within the range 0.0, 1.0. A pixel intensity value 0.0 corresponds to the lowest intensity value, and 1.0 as the maximum intensity value. The darkening of the pixel intensity corresponds to an increasing of the pixel intensity value, whereby a value 1.0 is the darkest possible value. The lightening of pixel intensity corresponds to a decrease of the pixel intensity value, whereby a value 0.0 is the lightest possible value.

Desirably the values corresponding to the pixel intensity and the area may be represented by discrete units of storage also called BYTE. Storage units called BYTE are often represented by a set of eight bits, whereby each bit may represent two possible states. The usage of BYTE allows representing 256 distinct values, where a value of 0 is mapped to 0.0 and 255 is mapped to 1.0, and all other intermediate values are mapped in equal distance units apart within the range (e.g. value 128 is mapped to 0.5). For improved quality/precision, one may support usage of floating point number values or higher number of bits (e.g. 16-bits, 32-bits, 64-bits, etc.) to represent the pixel intensity values.

Now, for the corner pixels that are identified in step 602, the pixel intensity is adjusted according to its neighbouring pixels in step 605.

Figure 11:
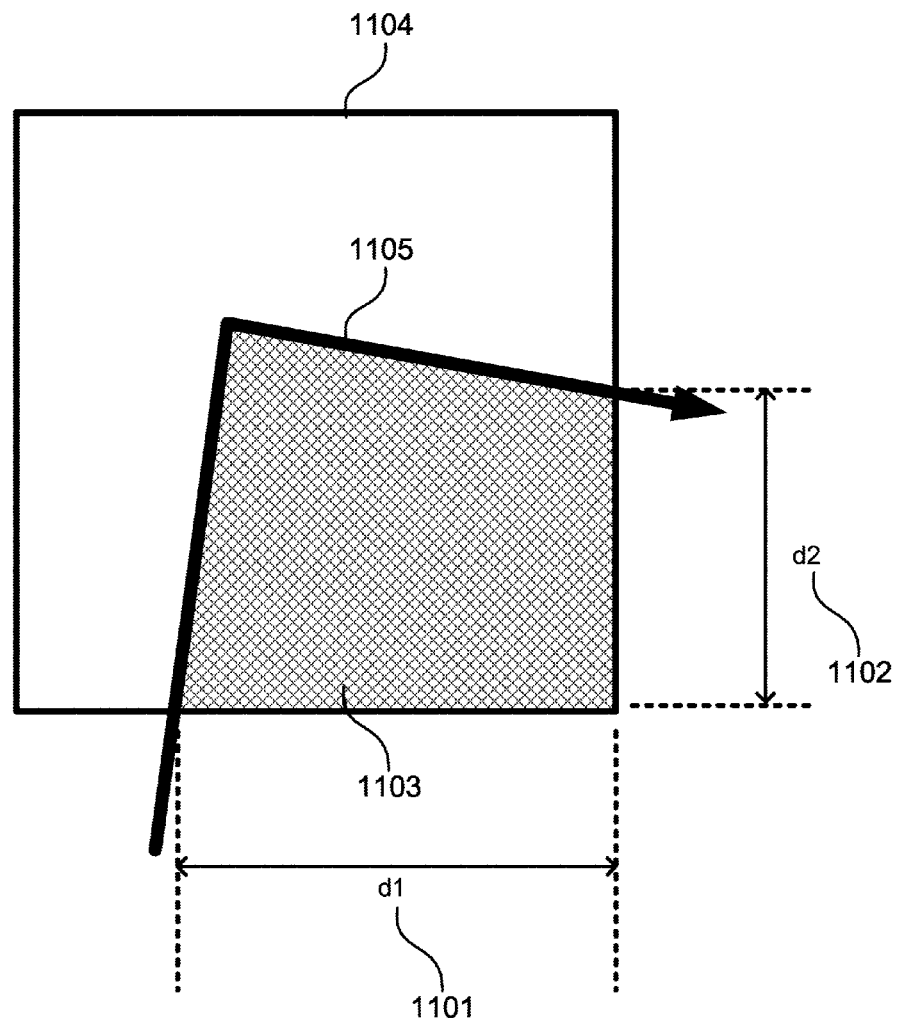
FIG. 11 illustrates a corner pixel with the calculation of the area coverage.

With reference to FIG. 11, the pixel area calculation will be explained. Given that a pixel of interest (i.e. a corner pixel) will have two intersection positions, corresponding to an entry position d1 1101 and an exit position d2 1102, then the intensity values of the neighbouring pixels can be estimated as d1 and d2 respectively. As seen in FIG. 11, a glyph outline 1105 forms an enclosed area 1103 that is bounded by the outline 1105 and the pixel boundary 1104, according to the specified winding rule. A magnitude of the area 1103 may be calculated using various means. Typically, point sampled anti-aliasing is employed to calculate the area, but other area calculation methods may be used which calculate the area value based on geometry. For example, subject to the desired precision, the magnitude of the area 1103 may be approximated simply by multiplying d1 and d2. Such an approach will provide a reasonable estimate that is typically be better than 2×2AA.

Figure 12:
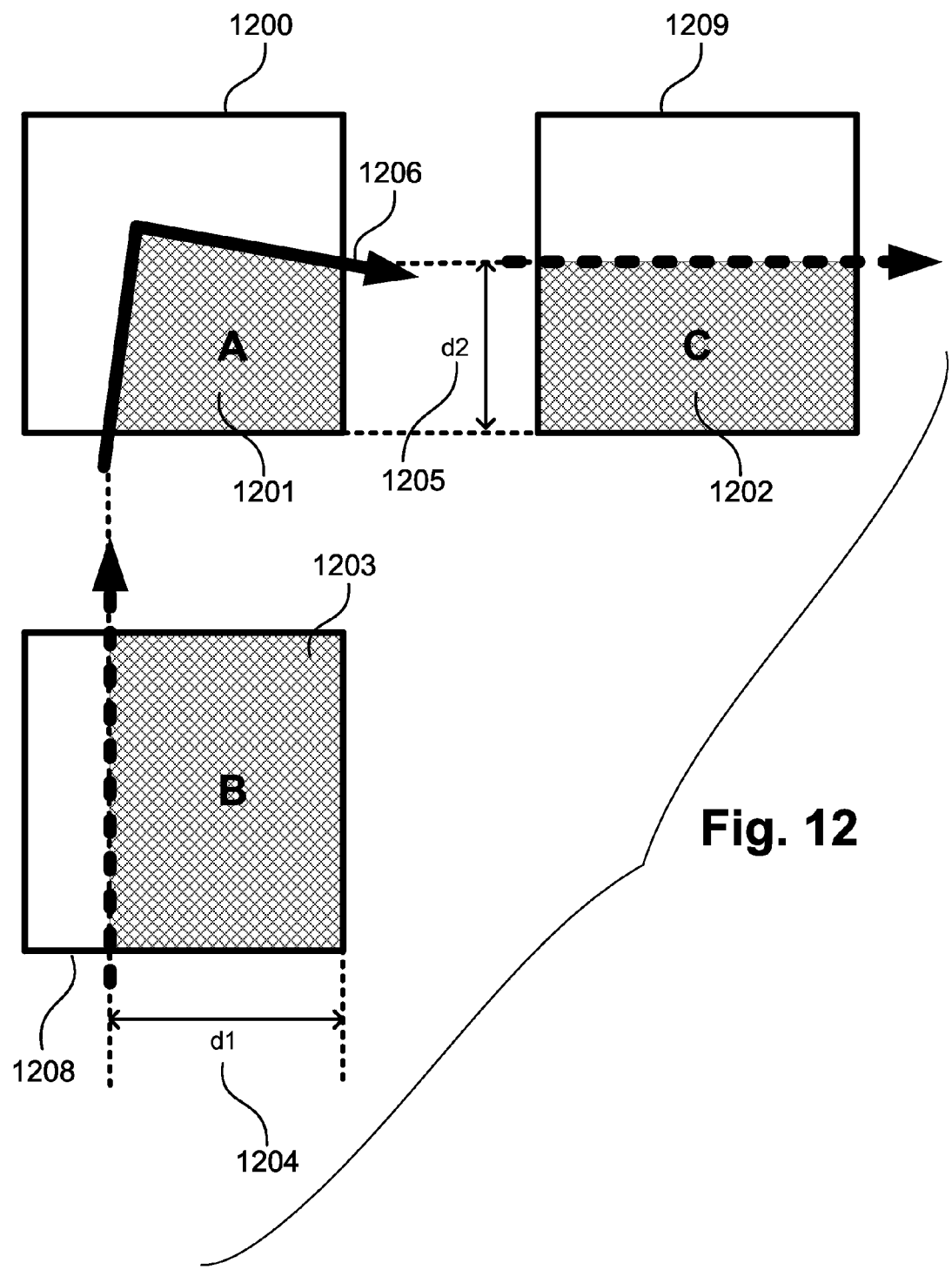
FIG. 12 illustrates a non-reflex (<180 degrees) corner with the calculation of the estimated area coverage for the neighbouring pixels and the corner pixel.

With reference to FIG. 12, a preferred method for the calculation of the pixel intensity for a non-reflex angle will be described. A non-reflex angle corresponds to a corner which subtends an angle which is less than 180 degrees and more than 0 degrees. Shown in FIG. 12 are the values that are employed in the adjustment of intensity for a corner pixel 1200 corresponding to a non-reflex corner. The corner pixel 1200 is shown together with horizontal and vertical adjacently located neighbouring pixels 1209 and 1208 in "exploded" fashion in FIG. 12, for clarity. The corner pixel area A 1201, is firstly calculated, according to the principles discussed above for the area 1103, based on the edge 1206 intersecting the pixel 1200 at the entry and exit locations represented by d1 1204 and d2 1205 respectively. The neighbouring pixels 1208 and 1209, which are derived based on respective intersection positions d1 1204 and d2 1205, have an estimated intensity value of B 1203 and C 1202 respectively. Utilising the values B 1202 and C 1203, the area value A 1201 is modified to produce the final intensity value for the corner pixel 1200.

In one implementation, the determined area value of the corner pixel 1200 may be modified according to the following expression:

$$pixel_{acute\ corner}(A, B, C) = A \frac{1}{\max(B, C)}$$

The larger area of B or C is selected to modify the area A. The area of A will be increased by the inverse of the area of either B or C as the areas B and C are each in the range of 0 to 1.0. The result is that the pixel will be darkened.

Figure 13:
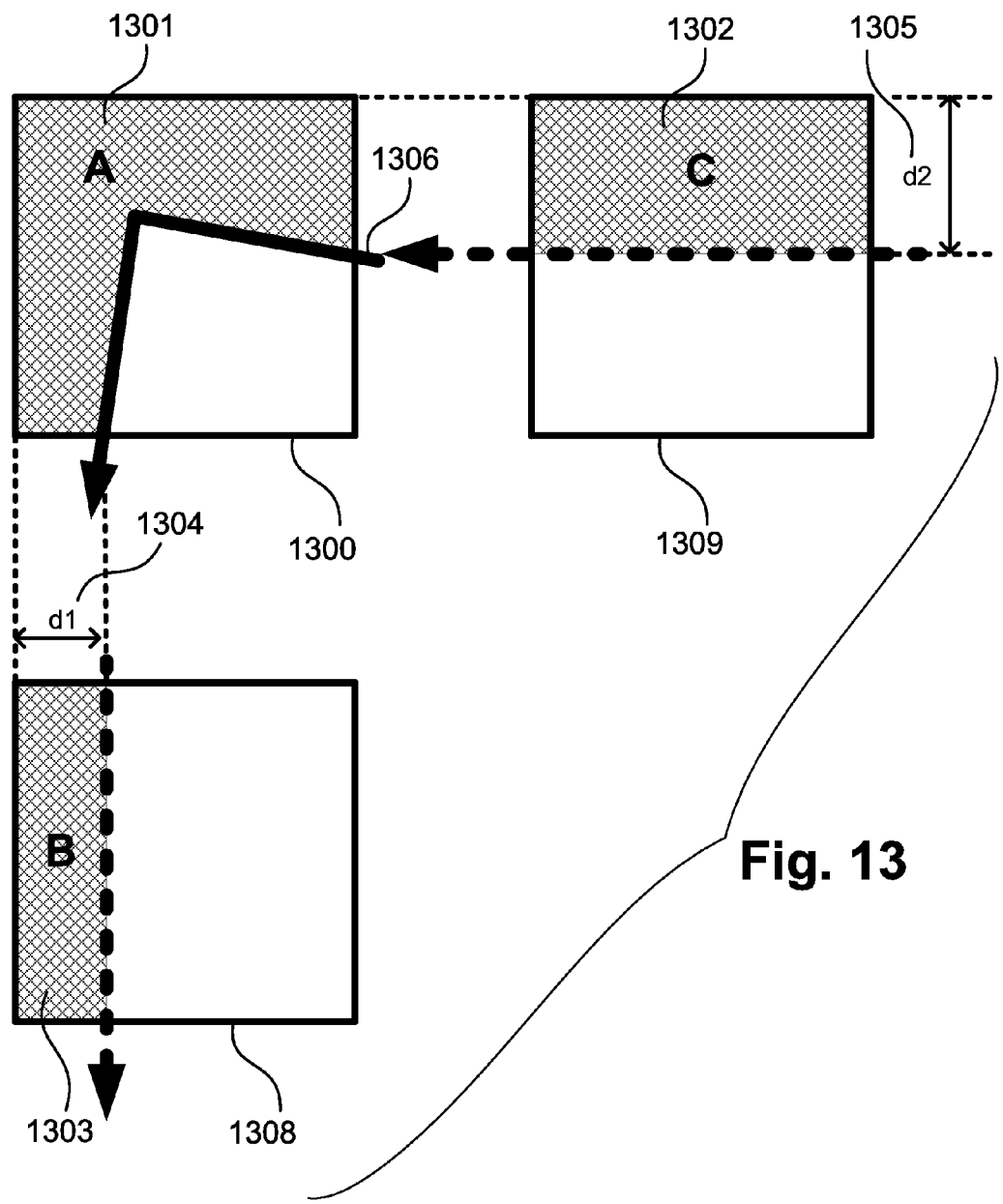
FIG. 13 illustrates a reflex (>180 degrees) corner with the calculation of the estimated area coverage for the neighbouring pixels and the corner pixel.

With reference to FIG. 13, the calculation of the pixel intensity for a reflex angle will be described. A reflex angle corresponds to a corner which subtends an angle which is less than 360 degrees and more than 180 degrees. Shown in FIG. 13 are the values that are employed in the adjustment of intensity for a corner pixel 1300 corresponding to a reflex corner. The corner pixel 1300 is shown together with horizontal and vertical adjacently located neighbouring pixels 1309 and 1308 in "exploded" fashion in FIG. 13, for clarity. The corner pixel area A 1301, is firstly calculated based on the transiting edge 1306, according to the specified winding rules. In the case of a reflex angle, the area corresponds to side of the corner projected by an angle greater than 180 degrees. The neighbouring pixels 1308 and 1309, which are derived based on respective intersection positions d1 1304 and d2 1305, have estimated intensity values of B 1303 and C 1302 respectively. Utilising the values B 1303 and C 1302, the area value A 1301 is modified to produce the final intensity value for the corner pixel.

For corner pixels that correspond to a reflex corner pixel, the determined area of the corner pixel can be modified according to the following expression:

$$pixel_{reflex\ corner}(A, B, C) = 1 - \frac{1-A}{\max(1-B, 1-C)}$$

The application of this modification to the area value corresponding to the reflex corner, results in the lightening of the pixel intensity in comparison to the area coverage value. By lightening the reflex corner pixels, then the appearance of the corner pixels are improved.

Figure 14:
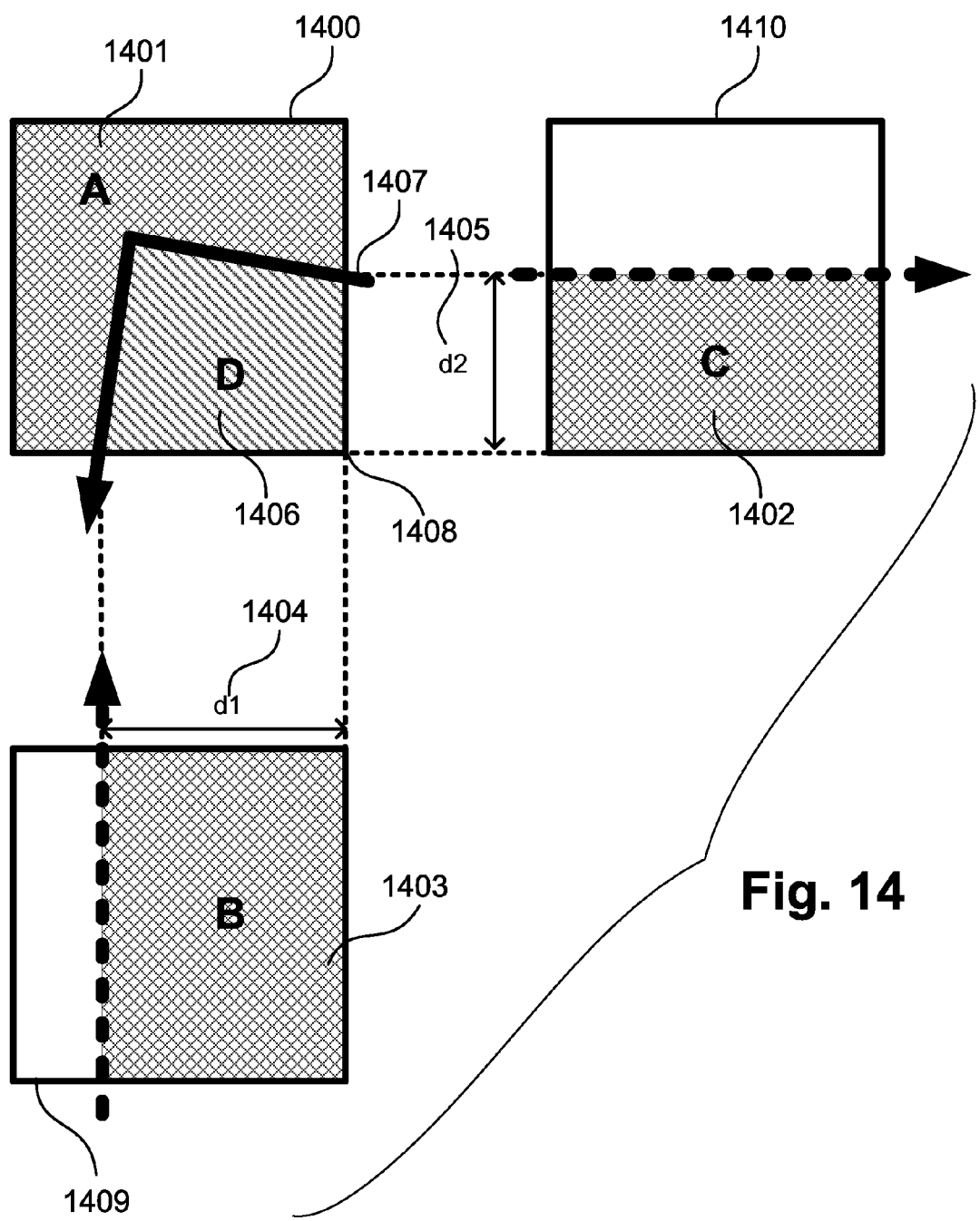
FIG. 14 illustrates an alternative calculation of reflex (>180 degrees) corner with the calculation of estimated inverse area coverage for the neighbouring pixels.

With reference to FIG. 14 an alternative approach for the calculation of pixel intensity for reflex corners is explained. This approach makes use of the determination of the entry and exit positions of the corner pixel without regard to the winding count of the edge. With such a step, the pixel entry and exit positions correspond to the distances measured from the common corner point. The common corner point corresponds to the intersection of the two pixel boundaries that were intersected by the edges entering and exiting the pixel. The corner pixel 1400 is shown together with horizontal and vertical adjacently located neighbouring pixels 1410 and 1409 in "exploded" fashion in FIG. 14, for clarity. In FIG. 14, edge 1407 intersects a corner pixel 1400 on the right pixel vertical boundary and the bottom horizontal boundary. The two boundaries have an intersection point at a corner point 1408 located on the bottom-right corner of the pixel 1400. The measured entry and exit positions correspond to d1 1404 and d2 1405 which measure the distance from the common corner point 1408. By using the entry and exit positions calculated from the common corner point 1408, then estimations for the inverse area values are determined, corresponding to the areas B 1403 and C 1402 of neighbouring pixels 1409 and 1410 respectively. Then the inverse area of the corner pixel 1400 is determined by calculating A 1401, whereby an area coverage value D 1406 for the corner pixel 1400 is subtracted from the total area of the pixel (i.e. by calculating 1-D). This calculation of the area coverage complies with the winding rules as the area A 1401 is situated to-the-right side of the edge with consideration of the heading or the direction of the edge. By calculation of the pixel intensity relative to the non-reflex angle positions, the determination of the pixel intensity value may be simplified to the following:

$$pixel_{reflex\ corner}(A,B,C)=1-pixel_{acute\ corner}(1-A,B,C).$$

Figure 15:
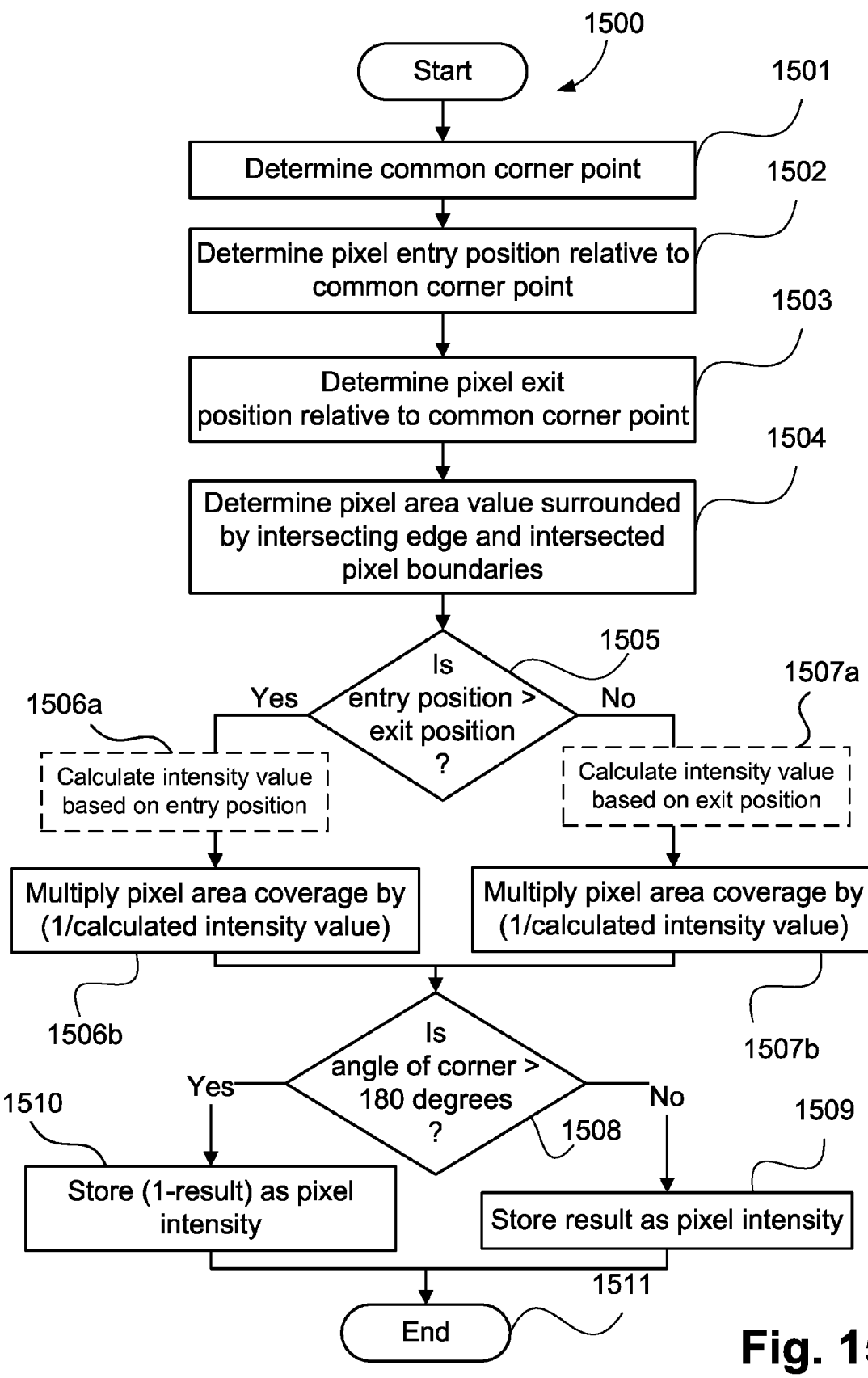
FIG. 15 illustrates a schematic flow diagram illustrating a method of processing corner pixels to form the adjusted pixel intensity for the corner pixels.

FIG. 15 shows a flow chart of the steps of a preferred pixel attenuation process 1500 for corner pixels, representing combination of the approaches described above. The process 1500 is preferably implemented in software and executed by the processor 1705 and operates to modify the intensity of the pixel values. A common corner point, as described above, is determined at step 1501 for a corner pixel. This is performed by identifying the pixel boundaries intersected by the edges, and then determining the corner position shared by the identified pixel boundaries. Then the pixel entry position is determined at step 1502 by measuring the distance between the co-ordinates of the entering pixel boundary intersection point to the common corner point. Next, the pixel exit position is also determined at step 1503 by measuring the distance between the co-ordinates of the exiting pixel boundary intersection point to the common corner point. Next, at step 1504 the area value for the corner pixel is calculated corresponding to the area surrounded by the intersecting edges and the intersected boundaries. The entry and exit positions are then compared at step 1505, whereby the larger value is determined. If step 1505 determines that the magnitude of the entry position is larger than the magnitude of the exit position, then process 1500 proceeds to step 1506*a*. At step 1506*a* the processor 1705 calculates the intensity value based on the entry position. Step 1506*b* then modifies the pixel area coverage value is modified by dividing by the calculated intensity value at the entry position. This may be implemented as illustrated by multiplying by the inverse of the intensity value at the entry position which is derived by calculating (1/intensity at entry position). If the determination at step 1505 determines that the entry position is not greater than exit position, then the process 1500 proceeds to step 1507*a* where the processor 1705 calculates the intensity value based on the exit position. At step 1507*b* the pixel area coverage value is modified by dividing by the intensity at the exit position (which may also be produce by multiplying with the inverse as illustrated). Following from steps 1506 and 1507, each of which provide a corresponding result, the process 1500 then proceeds to step 1508 where a check is performed to determine whether the angle of the corner is greater than 180 degrees. This check is performed by considering the winding count associated with the object in concert with the boundary intersection values. If it is determined that the angle of the corner is less than 180 degrees (i.e. non-reflex angle), then the process 1500 proceeds to step 1509, where the result of the prior calculation (at step 1506 or step 1507) is then stored back into the pixel buffer as the determined pixel intensity value for the corner pixel. If it was determined at step 1508 that the angle was greater than 180 degrees, then the process 1500 proceeds to step 1510, where the inverse of the result (from steps 1506 or 1507) is calculated by evaluating the expression (1-result) and stored back into the pixel buffer as the pixel intensity value for the corner pixel. Following from steps 1509 and 1510, the process ends at step 1511 where the pixel buffer contains the final intensity value for the corner pixel.

The flowchart shown in FIG. 15 is capable in handling the situations of darkening non-reflex corners (<180 degrees) and lightening reflex corners (>180 degrees). The pixel buffer corresponds to the rasterised output of the outline and is used by the display device 1714 to determine which picture elements, within the display, are activated with the required intensity.

The flowcharts of FIG. 6 and FIG. 15 are generally related in that steps 1501-1504 of FIG. 15 generally correspond as sub-steps of step 604 of FIG. 6, and steps 1505-1510 generally correspond as sub-steps of step 605. For steps 1501-1503, these may be generated from the entry/exit locations generated from step 603.

In another implementation, an alternative adjustment strategy may be employed. According to this alternate implementation, simplified adjustments may be performed upon corners that are orthogonal and edges are parallel to the pixel boundaries. An example of such case is illustrated in FIG. 5A, whereby edge 501 is composed of a vertical edge segment and a horizontal edge segment, intersecting the bottom pixel boundary at a 90 degrees angle and the right pixel boundaries at a 90 degrees angle.

Figure 16:
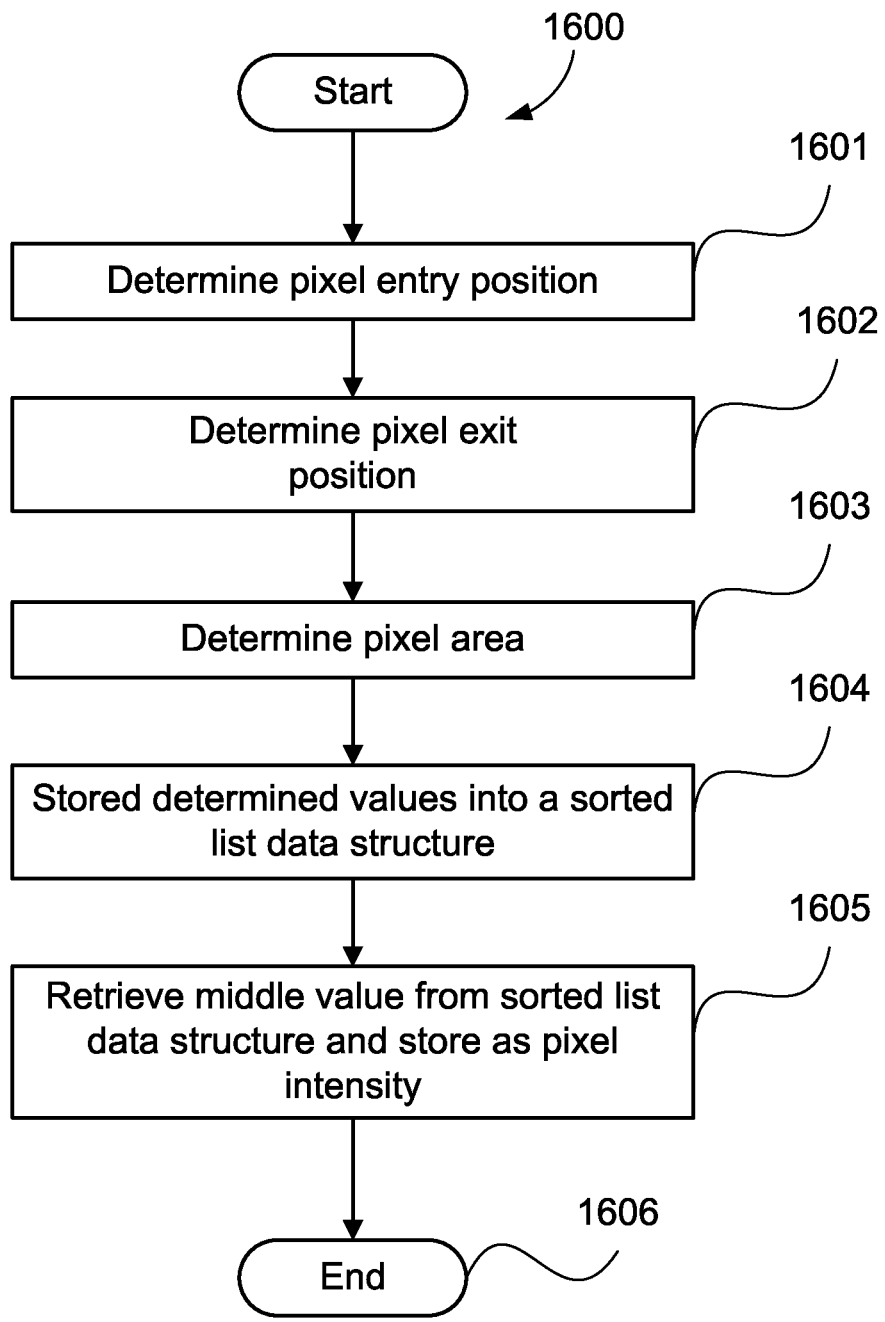
FIG. 16 illustrates a schematic flow diagram illustrating a method of performing the corner pixel intensity calculation according to a further implementation.

With reference to FIG. 16, a process 1600 for calculation of the pixel intensity value for such a corner pixel is described. The process 1600 begins by determining an entry position for the corner pixel at step 1601. A coverage area for the neighbouring pixel adjacent to the entry position may then be determined from the entry position by assuming that the area covered in the pixel is rectangular. The entry position combined with the width of the pixel may be used to determine the coverage area. The process 1600 then proceeds to the next step 1602 where an exit position for the corner pixel is determined A coverage area of the neighbouring pixel adjacent the exit position may then be determined according to the exit position and the width of the pixel. Next at step 1603 the coverage area of the corner pixel, with consideration of the winding count, is determined. The three values determined at steps 1601, 1602 and 1603 are stored into a sorted list data structure at step 1604, formed for example within the memory 1706. Then, at step 1605, the value in the middle entry, corresponding to the median value, of the sorted list of three values is retrieved and stored into the pixel buffer as the final pixel intensity value. The process 1600 is complete at step 1606, whereby the final adjusted pixel value is determined for the corner pixel.

Alternatively to steps 1604 and steps 1605 where a list data structure is utilised, the three determined values may be compared directly and the value corresponding to the median value is ascertained and utilised as the pixel intensity value for the corner pixel. The sorting steps in steps 1604 and 1605 imply this comparison step and the retrieval of the middle entry implies the value with the median value.

A further alternative in the process 1600 is to skip the corner pixel coverage area step 1603 and use either of the adjacent pixel coverage areas as the coverage area of the corner pixel. Either the smaller or larger of the adjacent pixel coverage areas may be selected and used as the coverage area of the corner pixel.

With such an implementation, both reflex (i.e. 270 degree) and non-reflex (i.e. 90 degree) corner pixels are adjusted accordingly, whereby the effect is reflex angles (270 degrees) are lightened and non-reflex angles (90 degrees) are darkened

INDUSTRIAL APPLICABILITY

The arrangements described are applicable to the computer and data processing industries and particularly for the accurate display of text and font characters formed using corners.

The foregoing describes only some embodiments of the present invention, and modifications and/or changes can be made thereto without departing from the scope and spirit of the invention, the embodiments being illustrative and not restrictive.

I claim:

1. A method of determining a contribution of an object to an intensity value of a current pixel that is partially covered by the object, the method comprising:
    (a) calculating an entry location and exit location for an edge of the object in the current pixel, the entry and exit locations being located on boundaries of the current pixel with perpendicular orientations;
    (b) determining an intensity value for a neighbouring pixel located adjacent to the current pixel, the neighbouring pixel being selected from adjacently located pixels based on the calculated entry and exit locations; and
    (c) determining an intensity value of the current pixel using the determined intensity value of the neighbouring pixel.

2. A method according to claim 1, wherein the determining of the intensity value of the at least one neighbouring pixel comprises estimating the intensity value using the corresponding entry or exit location.

3. A method according to claim 1, wherein the determining of the intensity value of the current pixel comprises determining whether the edge includes a corner that subtends a reflex angle or a non-reflex angle in the current pixel using the entry and exit locations and a winding rule associated with the object.

4. A method according to claim 3 wherein, where the corner subtends a non-reflex angle, the determining of the intensity value of the current pixel comprises:
    calculating a corner pixel area (A) of the current pixel using the entry and exit locations;
    estimating intensity values (B,C) of the neighbouring pixels using the corresponding entry and exit locations; and
    determining the intensity value of the current pixel, by darkening the corner pixel according to the estimated intensity value of one of the neighbouring pixels.

5. A method according to claim 4 wherein the determining of the intensity value comprises evaluating the intensity value of the current pixel according to the expression:

$$pixel_{acute\ corner}(A, B, C) = A\frac{1}{\max(B, C)},$$

wherein the determined intensity value of the current pixel is between a lowest pixel intensity value and a highest pixel intensity value.

6. A method according to claim 3 wherein, where the corner subtends a reflex angle, the determining of the intensity value of the current pixel comprises:
    calculating a corner pixel area (A) of the current pixel using the entry and exit locations;
    estimating intensity values (B, C) of the neighbouring pixels using the corresponding entry and exit locations; and
    determining the intensity value of the current pixel, by lightening the corner pixel according to the estimated intensity value of one of the neighbouring pixels.

7. A method according to claim 6 wherein the determining of the intensity value comprises evaluating the intensity value of the current pixel according to the expression:

$$pixel_{reflex\ corner}(A, B, C) = 1 - \frac{1-A}{\max(1-B, 1-C)},$$

wherein the determined intensity value of the current pixel is between a lowest pixel intensity value and a highest pixel intensity value.

8. A method according to claim 3 wherein, where the corner subtends a reflex angle, the determining of the intensity value of the current pixel accords to the expression:

$$pixel_{reflex\ corner}(A,B,C)=1-pixel_{acute\ corner}(1-A,B,C).$$

9. A method according to claim 3, wherein the determining of the intensity value of the current pixel comprises:
    determining a pixel area coverage value for the corner pixel using the entry and exit locations;
    forming a result by:
        (i) multiplying the pixel area coverage value by an inverse of the determined intensity value corresponding to the neighbouring pixel of the pixel entry boundary where a magnitude of the entry location exceeds that of the exit location; or (ii) multiplying the pixel area coverage value by an inverse of the determined intensity value corresponding to the neighbouring pixel of the pixel exit boundary where a magnitude of the exit location exceeds that of the entry location;

determining the intensity value of the current pixel as the result where an angle of the corner is less than 180 degrees; and determining the intensity value of the current pixel as (1−result) where an angle of the corner as exceeds 180 degrees.

10. A method according to claim 1, wherein step (b) comprises storing determined intensity values for at least two neighbouring pixels in a sorted list data structure, and step (c) comprises:

(i) storing a coverage area value of the current pixel into the sorted list data structure; and (ii) retrieving a middle value from the sorted list data structure as the pixel intensity value for the current pixel.

11. A non-transitory computer readable storage medium having a program recorded thereon, the program being executable by a processor to determine a contribution of an object to an intensity value of a current pixel that is partially covered by the object, the program comprising:

code for calculating an entry location and exit location for an edge of the object in the current pixel, the entry and exit locations being located on boundaries of the current pixel with perpendicular orientations;

code for determining an intensity value for a neighbouring pixel located adjacent to the current pixel, the neighbouring pixel being selected from adjacently located pixels based on the calculated entry and exit locations; and code for determining an intensity value of the current pixel using the determined intensity value of the neighbouring pixel.

12. A non-transitory computer readable storage medium according to claim 11, wherein the determining of the intensity value of the at least one neighbouring pixel comprises estimating the intensity value using the corresponding entry or exit location.

13. A non-transitory computer readable storage medium according to claim 11, wherein the determining of the intensity value of the current pixel comprises determining whether the edge includes a corner that subtends a reflex angle or a non-reflex angle in the current pixel using the entry and exit locations and a winding rule associated with the object.

14. A non-transitory computer readable storage medium according to claim 13 wherein, where the corner subtends a non-reflex angle, the code for determining of the intensity value of the current pixel comprises:

code for calculating a corner pixel area (A) of the current pixel using the entry and exit locations;

code for estimating intensity values (B,C) of the neighbouring pixels using the corresponding entry and exit locations; and code for determining the intensity value of the current pixel, by darkening the corner pixel according to the estimated intensity value of one of the neighbouring pixels.

15. A non-transitory computer readable storage medium according to claim 14 wherein the code for determining of the intensity value comprises code for evaluating the intensity value of the current pixel according to the expression:

$$pixel_{acute\ corner}(A, B, C) = A \frac{1}{\max(B, C)},$$

wherein the determined intensity value of the current pixel is between a lowest pixel intensity value and a highest pixel intensity value.

16. A non-transitory computer readable storage medium according to claim 13 wherein, where the corner subtends a reflex angle, the code for determining of the intensity value of the current pixel comprises:

code for calculating a corner pixel area (A) of the current pixel using the entry and exit locations;

code for estimating intensity values (B, C) of the neighbouring pixels using the corresponding entry and exit locations; and code for determining the intensity value of the current pixel, by lightening the corner pixel according to the estimated intensity value of one of the neighbouring pixels.

17. A non-transitory computer readable storage medium according to claim 16 wherein the determining of the intensity value comprises evaluating the intensity value of the current pixel according to the expression:

$$pixel_{reflex\ corner}(A, B, C) = 1 - \frac{1-A}{\max(1-B, 1-C)},$$

wherein the determined intensity value of the current pixel is between a lowest pixel intensity value and a highest pixel intensity value.

18. A non-transitory computer readable storage medium according to claim 13, wherein the determining of the intensity value of the current pixel comprises:

determining a pixel area coverage value for the corner pixel using the entry and exit locations;

forming a result by:

(i) multiplying the pixel area coverage value by an inverse of the determined intensity value corresponding to the neighbouring pixel of the pixel entry boundary where a magnitude of the entry location exceeds that of the exit location; or (ii) multiplying the pixel area coverage value by an inverse of the determined intensity value corresponding to the neighbouring pixel of the pixel exit boundary where a magnitude of the exit location exceeds that of the entry location;

determining the intensity value of the current pixel as the result where an angle of the corner is less than 180 degrees; and determining the intensity value of the current pixel as (1−result) where an angle of the corner as exceeds 180 degrees.

19. A non-transitory computer readable storage medium according to claim 11, comprising code for storing determined intensity values for at least two neighbouring pixels in a sorted list data structure, and code for:

(i) storing a coverage area value of the current pixel into the sorted list data structure; and (ii) retrieving a middle value from the sorted list data structure as the pixel intensity value for the current pixel.

20. Computer apparatus for determining a contribution of an object to an intensity value of a current pixel that is partially covered by the object, the apparatus comprising:

means for calculating an entry location and exit location for an edge of the object in the current pixel, the entry and exit locations being located on boundaries of the current pixel with perpendicular orientations;

means for determining an intensity value for a neighbouring pixel located adjacent to the current pixel, the neighbouring pixel being selected from adjacently located pixels based on the calculated entry and exit locations; and code for determining an intensity value of the current pixel using the determined intensity value of the neighbouring.

\* \* \* \* \*